United States Patent [19]

Materi

[11] Patent Number: 5,807,491
[45] Date of Patent: Sep. 15, 1998

[54] ELECTRON BEAM PROCESS AND APPARATUS FOR THE TREATMENT OF AN ORGANICALLY CONTAMINATED INORGANIC LIQUID OR GAS

[75] Inventor: Guy E. Materi, Manchester, Tenn.

[73] Assignee: Advanced Oxidation Systems, Inc., Gaithersburg, Md.

[21] Appl. No.: 705,119

[22] Filed: Aug. 29, 1996

[51] Int. Cl.[6] .................................................. C02F 1/30
[52] U.S. Cl. .................. 210/748; 210/908; 204/157.44; 204/554; 588/227
[58] Field of Search .................................. 210/748, 908; 588/227; 204/157.44, 554

[56] References Cited

U.S. PATENT DOCUMENTS

| | | | |
|---|---|---|---|
| 3,891,855 | 6/1975 | Offermann | 250/492 |
| 3,901,807 | 8/1975 | Trump | 210/198 |
| 3,997,415 | 12/1976 | Machi et al. | 423/242 |
| 4,095,115 | 6/1978 | Orr, Jr. et al. | 250/538 |
| 4,189,363 | 2/1980 | Beitzel | 204/157.1 |
| 4,214,962 | 7/1980 | Pincon | 204/157.1 |
| 4,230,947 | 10/1980 | Cram | 250/434 |
| 4,233,126 | 11/1980 | Garcia | 204/157.1 |
| 4,372,832 | 2/1983 | Bush | 422/186 |
| 4,992,169 | 2/1991 | Ieumiya | 210/221.2 |
| 5,015,443 | 5/1991 | Ito et al. | 422/186 |
| 5,072,124 | 12/1991 | Kondo et al. | 250/432 |
| 5,451,790 | 9/1995 | Enge | 250/436 |
| 5,478,481 | 12/1995 | Kazama et al. | 210/748 |

OTHER PUBLICATIONS

Slater, R.C. and Douglas–Hamilton, D.H., "*Electron–Beam–initiated destriction of low concentrations of vinyl chloride in carrier gases*", (May 1981).

Bromberg, L. et al., "*Decomposition of Dilute Concentrations of Carbon Tetrachloride in Air by an Elctron–beam Generated Plasma*",(Aug. 1992).

Cooper, W.J. et al., "*High Energy Electron Beam Irradiation for dissinfection, Slude Management and the Removal of Hazardous Organic Chemicals from Water, Wastewater, and Slude an Overview*", (Jan. 1991).

Cleveland, M.R., "*Medium Energy Industrial Applications of EB Processing*", (Apr. 1992).

Swarbrick, J. and Boylan, J.C., "*Encyclopedia of Pharmaceutical Technology*", vol. 5, pp. 105–136 (1992).

Schonberg Radiation Corporation, "Electron Beam Detoxification and Disinfection: A Cost–Effective Solution for Environmental Problems" (Jul. 1991).

Cleland, Marshall R. and Beck, Jeffrey A., *Beam Sterilization* article excerpt, pp. 131–136.

*Primary Examiner*—Neil McCarthy
*Attorney, Agent, or Firm*—Waddey & Patterson; Edward D. Lanquist, Jr.

[57] ABSTRACT

A process and apparatus for treating a organically contaminated inorganic liquid or gas with an electron beam are described. The organically contaminated inorganic liquid or gas is introduced into a reaction chamber that is positioned so that the organically contaminated inorganic liquid or gas will be exposed to the electron beam. In the case of the gas, the reaction chamber includes a liquid medium. The process continues by generating a gaseous phase by exposing the organically contaminated inorganic liquid or the liquid medium including the organically contaminated inorganic gas to an electron beam; and recirculating the gaseous phase into the organically contaminated inorganic liquid or into the liquid medium including the organically contaminated inorganic gas. The treatment of the gas and liquid phase with the electron beam in this manner accomplishes the complete oxidation of the contaminating organic species. Additionally, the organically contaminated inorganic liquid or the liquid medium including the organically contaminated inorganic gas is circulated within the reaction chamber as electron beam exposure occurs, which facilitates the oxidation process.

35 Claims, 6 Drawing Sheets

Table 1 Waste Stream Treatment Results @125 KGray

| Waste Stream | % COD Reduction | Total CN ppm | Total NH3-N ppm |
|---|---|---|---|
| Surrogate 1 | 84.19 | NA | NA |
| Surrogate 2 | 72.57 | 0.21 | 107 |
| Surrogate 3 | 43.70 | 0.07 | 156 |

Table 2 Individual Contaminant Reductions @ 125 KGray

| Surrogate 1 Contaminant: | Starting ppm | Ending ppm | % Reduction |
|---|---|---|---|
| Methylene Chloride | 34,668 | NA | NA |

| Surrogate 2 Contaminant: | Starting ppm | Ending ppm | % Reduction |
|---|---|---|---|
| Acetonitrile | 21,819 | 5,844 | 73.22% |
| Acetone | 5,236 | 938 | 82.09% |
| Dimethylformamide | 26,227 | 18,845 | 28.15% |
| Methanol | 10,429 | 6,691 | 35.84% |
| Ethylacetate | 421 | 4 | 99.12% |
| Toluene | 81 | 0 | 100.00% |
| Sodium Chloride | 10,393 | | |
| Calcium Chloride | 10,393 | | |

| Surrogate 3 Contaminant | Starting ppm | Ending ppm | % Reduction |
|---|---|---|---|
| Methylene Chloride | 35,220 | 2,428 | 93.11% |
| Acetonitrile | 20,985 | 9,211 | 56.11% |
| Acetone | 5,036 | 2,077 | 58.76% |
| Dimethylformamide | 25,225 | 22,008 | 12.75% |
| Methanol | 10,031 | 7,640 | 23.83% |
| Ethylacetate | 405 | 56 | 86.10% |
| Toluene | 78 | 7 | 90.91% |
| Sodium Chloride | 9,996 | | |
| Calcium Chloride | 9,996 | | |
| Zinc Hydroxide | 2,999 | | |

000000# ELECTRON BEAM PROCESS AND APPARATUS FOR THE TREATMENT OF AN ORGANICALLY CONTAMINATED INORGANIC LIQUID OR GAS

BACKGROUND OF THE INVENTION

The present invention relates generally to a process and apparatus for treating an organically contaminated liquid or gas, and more particularly to a method of and apparatus for treating an organically contaminated liquid or gas using an electron beam. More particularly, the present invention relates to a method of and apparatus for treating organically contaminated water using an electron beam.

It will be appreciated by those skilled in the art that treating a medium, whether it be a gas or a liquid, that is contaminated with organic chemicals can be a difficult and expensive task. A particular example of such a task is the removal of organic contaminants from waste water.

The tremendous amount of waste water generated by industry and the adverse effects on the environment caused by its insufficient treatment and improper disposal have resulted in the development of government regulations controlling the treatment and subsequent discharge of waste water into the environment. In the United States, the regulations governing emissions from waste water and the treatment and disposal of waste water are codified in the Clean Air Act (CAA) Amendments; the Clean Water Act (CWA); the Research Conservation and Recovery Act (RCRA); and the Comprehensive Environmental Response, Compensation, and Liability Act (CERCLA). Strict enforcement of these regulations coupled with the ineffectiveness of current treatment methods and the inherent liability associated with waste disposal has caused industry to look for and develop new processes to treat waste water.

Although the literature cites numerous methods for the treatment of organic contaminants in water, most of these methods simply concentrate the pollutants, leaving a waste stream which requires additional treatment. The only processes which yield the environmentally acceptable by-products not requiring further treatment are the oxidation technologies. The oxidation technologies can be broken down into four basic categories: (1) biological; (2) thermal; (3) chemical; and (4) radiant energy systems.

Biological treatment methods are cost effective and tend to work well on low level organics. These methods, are, however, slow and show a susceptibility to poisoning. In the presence of high organic and inorganic contamination, they are generally rendered ineffective and consequently not used.

Thermal oxidation technologies, some of which are highly controversial, are currently considered the most viable method for the treatment of organics in water. These techniques are generally expensive and have been found, in many cases, to be ineffective and to create undesirable by-products. Incineration and catalytic oxidation, although fast and generally effective, have been found to create products of incomplete combustion (e.g. dioxins and furans) and acid gases ($NO_x$, $SO_2$) which are less desirable than the original pollutants. In addition, catalytic systems have shown a propensity for fouling and poisoning in the presence of inorganic compounds, which renders them ineffective. Wet air and supercritical oxidation are two additional thermal oxidation techniques. Both of these systems operate at temperatures below 750° F., but the pressure is generally on the order of 3,000 PSI. This makes these systems not only costly and difficult to maintain, but also somewhat unsafe. In addition, these techniques have been shown not to work on a number of compounds, yielding either incomplete oxidation products or limited effectiveness.

Ozone and hydrogen peroxide systems are the most widely used chemical oxidation systems. Although effective treatment techniques, they have been found to be ineffective for a variety of compounds. In many instances they require the use of catalysts and long reaction times in order to be effective. In addition, the reactions must be carefully controlled to ensure that explosive conditions are minimized.

Radiant energy treatment systems using gamma rays, x-rays, electron beams, and ultraviolet radiation are all cited in the literature. Gamma ray and X-ray systems have the inherent liability of radiation exposure to the operators of the equipment and as such generally require extremely thick safety shields. In addition, these techniques have been found to have limited effectiveness in the treatment of many organic compounds.

Electron beam and ultraviolet oxidation systems are currently limited to the treatment of water with very low levels of organics. Not unlike other radiant energy systems, they have been found to be ineffective on a number of compounds and show evidence of undesirable by-products.

Prior art shows that electron beams have been used to treat homogenous waste streams in the gas or liquid phase. The electron beam has been used to treat gas phase inorganic compounds such as $SO_8$ and $NO_x$. This process is aimed at the control of emissions from coal fired power plant stacks and has no applicability in the treatment of organic contaminants. In this process, an electron beam is used to increase the oxidation state of $SO_2$ and $NO_x$ which in turn induces a reaction with ammonia to form the respective ammonium salts. These salts are then recovered in a down stream bag house or electrostatic precipitator.

Electron beams have also been used in the treatment of gas phase organic compounds (VOCs) such as trichloroethylene, vinyl chloride, and methylene chloride. In these processes, a gas containing VOCs and oxygen sufficient to fully oxidize the organics is introduced into the reaction chamber and allowed to interact with an electron beam. The primary limitation of these processes is that they only treat organic contaminants in the gas phase. Neither is capable of treating organically contaminated liquids and consequently are not suitable for the treatment of most semi-volatile and water soluble organic contaminants. In addition, both processes are known to form water soluble organic by-products which must be captured and treated by other means. An example of such a process is disclosed in U.S. Pat. No. 5,378,898 issued to Schonberg, et al. on Jan. 3, 1995.

Electron beam processes have also been used in the treatment of liquid phase, volatile, semi-volatile and water soluble organics. In one such process, waste water is passed over a weir and allowed to flow down a wall forming a thin water film. A rectangular electron beam is focused along this wall such that it completely covers the width of the water but only a small portion of its length. See U.S. Pat. No. 4,230,947 issued to Cram on Oct. 28, 1980. Other such processes are described in U.S. Pat. No. 3,901,807 issued to Trump on Aug. 26, 1975; U.S. Pat. No. 5,451,790 issued to Enge on Sep. 19, 1995; and U.S. Pat. No. 5,072,124 issued to Kondo, et al. on Dec. 10, 1991. However, these processes have only been effective on waste water with fairly dilute organic concentrations.

What is needed, then, is a method and apparatus for treating an organically contaminated liquid or gas, and particularly organically contaminated waste water, that combines the benefits of liquid phase treatment methods with the benefits of gaseous phase treatment methods to produce an unexpectedly effective method and apparatus for decontaminating such an organically contaminated inorganic liquid or gas. Such a method and apparatus are presently lacking in the prior art.

SUMMARY OF THE INVENTION

A method of treating an organically contaminated inorganic liquid or gas is described. When an organically contaminated liquid is to be treated, the method comprises the steps of generating a gaseous phase by exposing the organically contaminated inorganic liquid to an electron beam; and recirculating the gaseous phase into the organically contaminated inorganic liquid. An example of the organically contaminated inorganic liquid is water.

The method can also further comprise the step of introducing the organically contaminated inorganic liquid into a reaction chamber, the reaction chamber positioned so that the liquid will be exposed to the electron beam. Preferably, the electron beam has the same cross-sectional shape as the reaction chamber. The method can also comprise the step of circulating the organically contaminated inorganic liquid within the reaction chamber.

The method can also comprise the steps of pretreating the organically contaminated inorganic liquid before exposing the liquid to the electron beam and the step of post-treating the organically contaminated inorganic liquid after exposing the liquid to the electron beam. The post-treating step can comprise salvaging a by-product within the organically contaminated inorganic liquid after the organically contaminated inorganic liquid has been treated.

The method can further comprise the step of exposing the organically contaminated inorganic liquid to ultraviolet radiation.

The method can further comprise the step of introducing a stripping gas into the organically contaminated inorganic liquid. When a stripping gas is used, the method can further comprise the steps of collecting the stripping gas after it passes through the organically contaminated inorganic liquid and recirculating the collected stripping gas into the organically contaminated inorganic liquid. In this case the stripping gas can be generated by passing a gas through the electron beam, the passing of the gas through the electron beam occurring at a point along the electron beam before the electron beam contacts the organically contaminated inorganic liquid.

The electron beam can be set up so that it passes through a first window and a second window before contacting the organically contaminated inorganic liquid, the first window and the second window defining a plenum. The stripping gas can be generated by passing a gas through the plenum.

A method of treating an organically contaminated inorganic gas is also described. The method can comprise the steps of introducing the organically contaminated inorganic gas into a liquid medium; generating a gaseous phase by exposing the liquid medium to an electron beam; and recirculating the gaseous phase into the liquid medium. An example of the liquid medium is water.

The method can further comprise the step of introducing the organically contaminated inorganic gas into a reaction chamber, the reaction chamber including the liquid medium, the reaction chamber positioned so that the liquid medium will be exposed to the electron beam. Preferably, the electron beam has the same cross-sectional shape as the reaction chamber. The method can also comprise the step of circulating the liquid medium within the reaction chamber.

The method can also comprise the steps of pretreating the organically contaminated inorganic gas before introducing the organically contaminated inorganic gas into the liquid medium and post-treating the organically contaminated inorganic gas. The post-treating step can comprise salvaging a by-product within the liquid medium after the organically contaminated inorganic gas has been treated.

The method can further comprise the step of exposing the organically contaminated gas to ultraviolet radiation after it is introduced into the liquid medium.

The method can further comprise the step of introducing a stripping gas into the liquid medium. The method can further comprise the steps of collecting the stripping gas after it passes through the liquid medium and recirculating the collected stripping gas into the liquid medium. The stripping gas can be generated by passing a gas through the electron beam, the passing of the gas through the electron beam occurring at a point along the electron beam before the electron beam contacts the liquid medium.

The electron beam can be set up so that it passes through a first window and a second window before contacting the liquid medium, the first window and the second window defining a plenum. In this case, the stripping gas can be generated by passing a gas through the plenum.

An apparatus suitable for carrying out the described methods is also described.

Accordingly, it is an object of this invention to provide an electron beam process and apparatus to decontaminate organically contaminated inorganic liquids and gases and to recover any valuable by-product formed by treatment in the system.

It is a further object of this invention to provide a method and apparatus for decontaminating organically contaminated inorganic liquids and gases that uses a combination of gaseous phase and liquid phase purification.

It is yet another object of this invention to provide a method and apparatus for decontaminating an organically contaminated inorganic liquid or gas wherein the gaseous phase generated by exposing the organically contaminated inorganic liquid or the liquid medium including the organically contaminated inorganic gas to an electron beam is recirculated into the liquid phase of the organically contaminated inorganic liquid or into the liquid medium containing the organically contaminated inorganic gas.

It is yet a further object of this invention to provide a method and apparatus for decontaminating an organically contaminated inorganic liquid or gas that provides for the constant regeneration of the interface between the liquid phase of the organically contaminated inorganic liquid, or the liquid medium including the organically contaminated inorganic gas, and the gaseous phase generated by an electron beam.

It is another object of this invention to provide a method and apparatus for decontaminating waste water using an electron beam.

It is yet another object of this invention to provide a method and apparatus for decontaminating waste water wherein the gaseous phase generated by exposing the waste water to an electron beam is recirculated into the liquid phase of the waste water.

It is yet a further object of this invention to provide a method and apparatus for decontaminating waste water that provides for the constant regeneration of the interface between the liquid phase of the waste water and the gaseous phase generated by an electron beam.

It is yet a further object of this invention to provide a method and apparatus for decontaminating waste water wherein complete oxidation of organic species within the water is accomplished.

Other objects and advantages will be apparent from the foregoing detailed description.

DESCRIPTION OF THE PREFERRED EMBODIMENT

The current invention relates to an improved method of treating an inorganic liquid or gas contaminated with organic chemicals with an electron beam. The terms "organic" and "inorganic" as used herein and in the claims are meant to have their well known and art recognized meanings. That is, the term "organic" has come to mean any compound containing the element carbon, and several exceptions, including binary compounds like the carbon oxides, the carbides, and carbon disulfide; such ternary compounds as the metallic cyanides, metallic carbonyls, phosgene ($COCl_2$), and carbonyl sulfides (COS); and the metallic carbonates, such as calcium carbonate and sodium carbonate. Further, the term "organic" is meant to include hydrocarbons and their derivatives as well as compounds containing nitrogen, oxygen, sulfur, etc. in addition to hydrogen and carbon, e.g. carbohydrates. The term "inorganic" is meant to describe substances which do not contain carbon, except for the exceptions listed above. For definitions of these terms, reference can be made to Hampel and Hawley, *Glossary of Chemical Terms,* 2nd Edition (Van Nostrand Reinhold Company, Inc. 1982). The terms "organic" and "inorganic" can also be characterized by the examples disclosed herein.

By the term "organically contaminated", as used herein and in the claims, it is meant that the inorganic sample includes contaminating organic species.

Before proceeding with the detailed description of the method and apparatus of this invention, a discussion of the physics and chemistry of the reactions occurring in the gas phase and liquid phase of the method is warranted. Particularly, this discussion is warranted to describe the reactions generated by the electron beam.

1. Energy Equivalence of Radiation and High Energy Particles

In a radical departure from classical electromagnetic theory, Planck in 1900 proposed that radiation of frequency f was emitted and absorbed in a discrete quantity of energy equal to hf, where h is a universal constant. According to Planck, the quantum energy of radiation is defined by:

$$Ek=hf=hc/\lambda$$

where:

$E_k$=kinetic energy (ev)

h=Planck's constant ($4.1356 \cdot 10^{-15}$ ev·s)

f=frequency (1/s)

c=speed of light ($3 \cdot 10^8$ m/s)

$\lambda$=wavelength (m)

The first proof of Planck's quantum principle came from observation of the photoelectric effect by Heinrich Hertz in 1887. It was however, not correctly explained until Einstein introduced his photoelectric equation in 1905. Using Planck's quantum principle, Einstein established the relationship between the quantum energy of radiation and the kinetic energy of highly energetic particles. According to this equation, the kinetic energy of a particle, neglecting relativistic concerns, can be related to Planck's quantum energy by:

$$Ek=hf=\tfrac{1}{2} mv^2+\phi$$

where:

$E_k$=kinetic energy (kg m$^2$/s$^2$)

m=mass of a particle (kg)

v=velocity of the particle (m/s)

$\phi$=work function of the surface (all metals range from 2 to 5 ev)

In 1924, De Broglie hypothesized that particles had a wavelength associated with their momentum in the same manner as photons. This was later experimentally verified, and as a consequence the wavelength for both radiation and highly energetic particles has been defined by the following relationship:

$$\lambda=h/P=c/f=h/mv$$

where:

$\lambda$=wavelength (m)

h=Planck's constant ($4.1356 \cdot 10^{-15}$ ev·s)

P=momentum (ev·s/m)

c=speed of light ($3.0 \cdot 10^8$ m/s)

f=frequency of the radiation (1/s)

m=mass of the particle (kg)

v=velocity of the particle (m/s)

Now that the fundamental equations have been laid out, this can be put in perspective by relating it to various types of radiation.

| Spectral or Particle | Region wavelength (nm) | Velocity (m/s) | Quantum Energy (ev) |
|---|---|---|---|
| Far X-ray | 0.03 | $3.0 \cdot 10^8$ | 41,356.00 |
| Near X-ray | 0.30 | $3.0 \cdot 10^8$ | 4,135.60 |
| Far Ultraviolet | 3.00 | $3.0 \cdot 10^8$ | 413.56 |
| Near Ultraviolet | 30.00 | $3.0 \cdot 10^8$ | 41.35 |
| Visible Light | 500.00 | $3.0 \cdot 10^8$ | 2.48 |
| 10 kv electron | 0.01 | $5.9 \cdot 10^7$ | 10,000.00 |

2. Radiation Chemistry

Radiation chemistry is the study of the chemical effects on materials exposed to high energy, ionizing radiation. Chemical changes due to ionizing radiation are produced by the formation of excited molecules, ion pairs, and free radicals. Excited molecules are produced in a similar manner to those produced by ultraviolet radiation with several important differences.

Ionizing radiation is of significantly higher energy than the energy found in photons of the UV or longer wavelength spectrums (i.e. kev or mev as opposed to ev). Each photon or particle of ionizing radiation has sufficient energy to excite or ionize several thousand molecules lying along its path, whereas a UV photon will generally excite only one molecule.

In radiation induced excitation and ionization, the energy absorbed from x and gamma photons or from highly energetic particles (electrons, protons, etc.) by the molecules in the system is dissipated by promoting outer orbital electrons producing a relatively loosely bound electron. In fact, electrons can be completely freed and carry off energy in excess of the binding energy of the electron to the atom. These secondary electrons subsequently react with other molecules until their energy is low enough to be thermalized. This process of excitation and ionization is not specific and will effect all molecules in the system.

In photochemical reactions the energy of the photon is completely absorbed by the molecule. This energy is subsequently dissipated in the molecule by promoting inner orbital electrons to outer orbitals. In addition, this absorption process is regulated by quantum considerations and as such is selective and dependent on the molecular structure of the absorbing molecule.

Photochemically induced reactions produce randomly distributed excited species in any plane perpendicular to the incident light. Whereas, ionizing radiation produces excited species concentrated along the paths of charged particles.

3. Chemical Reactions Induced by an Electron Beam

A highly energetic electron beam, like other forms of ionizing radiation, induces the formation of ion pairs, free radicals, and excited molecules in all phases in which it comes into contact. In the method of this invention system there are two phases: gas and liquid. Thus, it is important to understand what types of reactions are prevalent in the two phases.

4. Aqueous Phase Reactions

The bulk of the liquid phase undergoing reaction is water. Consequently, the majority of the energy absorbed by the liquid will be used to form the primary radiolysis products of water: $e_{aq}^-$, $H^+$, and $OH^-$. Since competition occurs for $e_{aq}$ between $H^+$, organics, and $O_2$, it is the $OH^-$ radical that plays the largest role in the breakdown of organics in aqueous systems.

The radiolysis products, particularly the $OH^-$ radical, tend to react with the functional groups present in organics to form peroxy radicals. The peroxy radicals in turn abstract loosely bound hydrogen from other organics which form a hydroperoxy compound and another free radical. The hydroperoxy compound subsequently breaks down forming peroxy and alkoxy radicals which further propagates the chain reaction until the organic is fully oxidized.

5. Gas Phase Reactions

In contrast to liquid phase systems, gas phase reactions are not limited to those reactions which are generally concentrated along a particle track. Electron charge transfer in the bulk gas plays a significant role in the formation of excited species and free radicals. In addition, the radicals that are formed readily diffuse and react throughout the system. The transient species formed tend to have longer lifetimes and lose energy more slowly because the rate of collision is slower. Consequently the radiolysis mechanisms are generally much more complex in gaseous systems than in their liquid counterparts.

Since the method of this invention operates in an oxidizing mode, the primary characteristics of the gas phase composition is considerably different than in the liquid. The bulk of the gas, $N_2$ and $O_2$ (or $O_2$ for oxygen based systems), is in far greater supply than the organic contaminants and water vapor. Consequently, the transient reaction products and pathways are going to prominently include much higher levels of activated oxygen species than found in the liquid phase. That is excited oxygen, ozone, and the ionized species $O^-$, and $O_2^-$ will participate in far more reactions than in the liquid phase.

6. Electron Beam Chemistry of the Method of this Invention

The electron beam treatment method of this invention causes both the aqueous phase and gas phase reactions described above to occur simultaneously. This invention also provides a mechanism wherein the active species formed in the gas phase reaction are allowed to react with the organics in the aqueous phase yielding breakdown of the aqueous phase organics that was heretofore not possible. As a further consequence, the breakdown of organics in the aqueous phase coupled with the stripping action of the gas allows further oxidation of organics in the gas phase, also a reaction pathway not heretofore possible.

As discussed herein, tests have shown that the combination of individual and mixed phase reactions is more efficient than either of the individual phase modalities of treatment.

EXAMPLE 1

The method of this invention significantly improves on prior art by combining several basic chemical, physical, and mass transfer principals in one device and then coupling this device with other conventional treatment methods. The method comprises three basic steps: pretreatment, treatment, and post-treatment.

In the foregoing non-limiting example organically contaminated water is described as the inorganic liquid to be treated. Pretreatment comprises those unit operations necessary for the adjustment of pH, pressure, temperature; the removal of suspended solids; and conditioning of the water by the addition of chemical reactants to include oxidants, catalysts, and nutrients which allow optimum operation of the system. As used herein and in the claims, the terms "pretreatment" and "pretreating" are meant to refer to such operations. The equipment necessary to effect pretreatment of the water are all of conventional design. The equipment required for the pretreatment of any specific waste water stream will be determined solely by the specific characteristics of the stream to be treated. Other examples of suitable pretreatment units can be found in U.S. Pat. No. 4,230,947; U.S. Pat. No. 3,901,807; U.S. Pat. No. 5,451,790; and U.S. Pat. No. 5,072,124, the contents of each of which are herein incorporated by reference. A pretreatment module is shown at 40 in FIG. 1.

Figure 1:
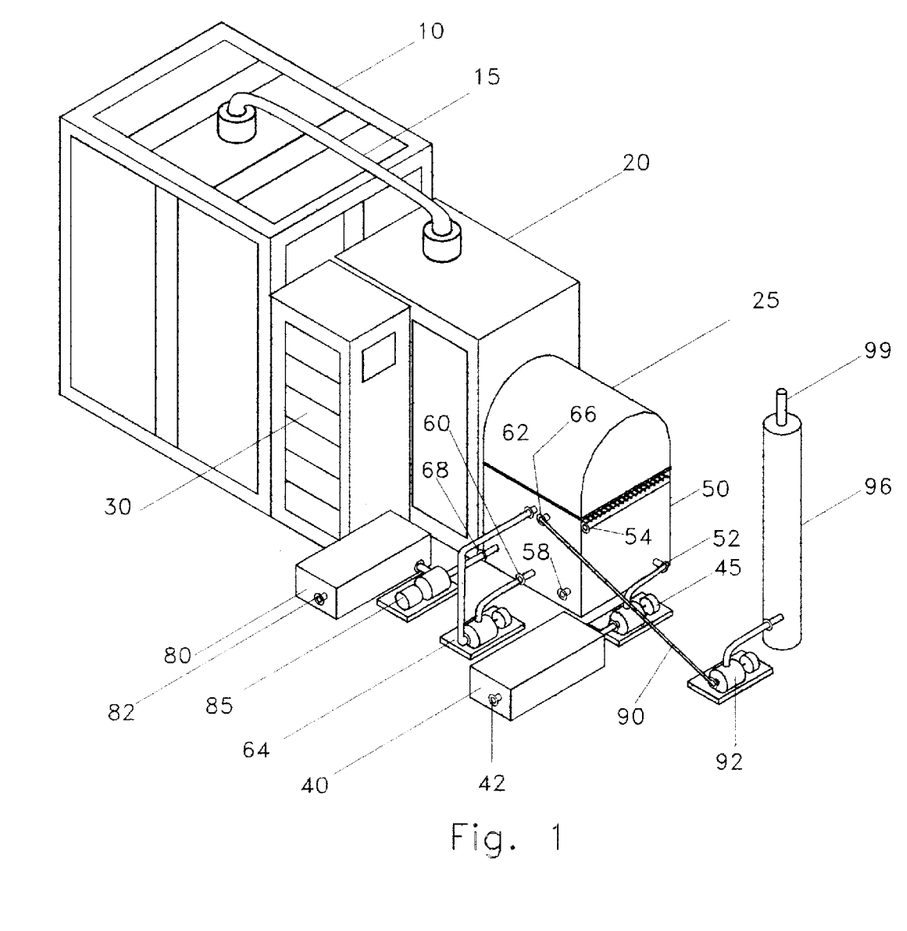
FIG. 1 is an isometric view of the apparatus of the present invention.
Figure 2A:
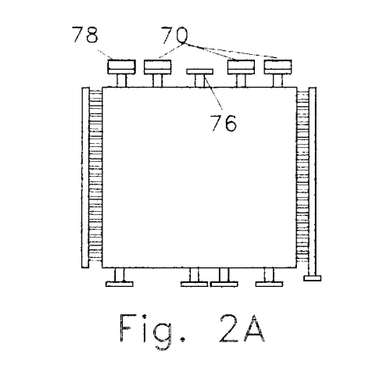
FIG. 2 is a plan view of the method of the present invention.
Figure 2B:
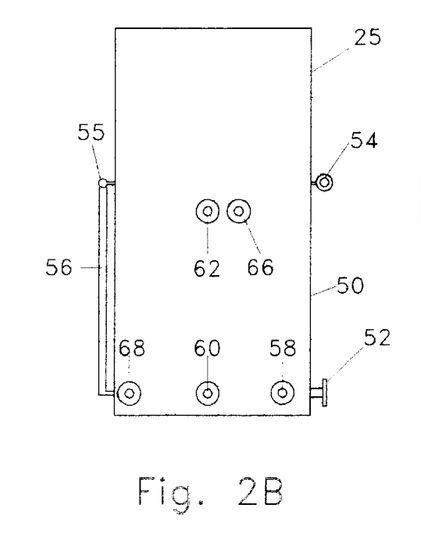
Figure 2C:
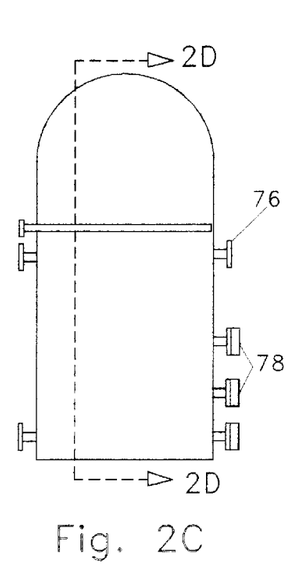
Figure 2D:
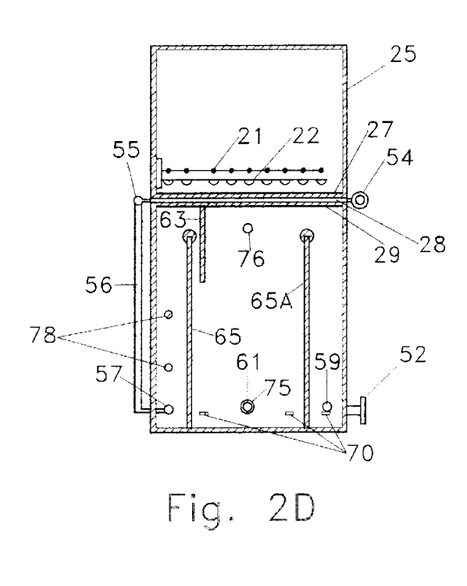

Treatment involves the introduction of contaminated water into a novel reaction chamber attached to an electron beam generator, as shown in the apparatus isometric of FIG. 1. Here the waste water undergoes the simultaneous application of several chemical and physical mechanisms to remove organic contaminants and purify the contaminated water.

Referring now to FIG. 1, a power generator capable of powering the method and apparatus of this invention is referred to at 10. Power generator 10 is connected via high voltage cable 15 to electron beam generator 20. The power controller 10 and the electron beam generator 20 are coupled to station controller 30. Station controller 30 includes suitable electronic controls and circuits as would be necessary for operating the below described electron beam generator, pumps, valves, fans, vents, inlets and the like in a suitable sequence.

Figure 3A:
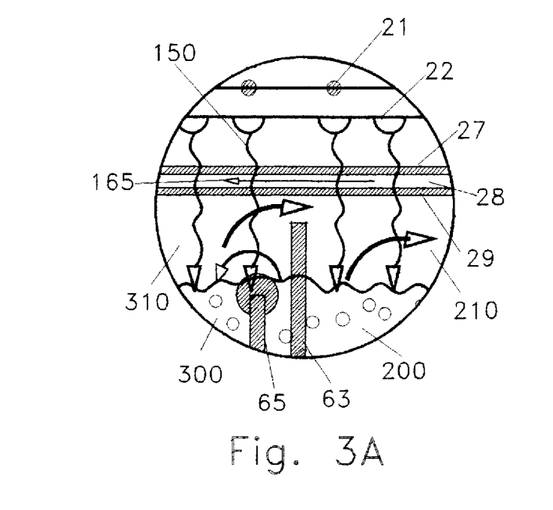
FIG. 3 is a schematic of the method of the present invention.
Figure 3B:
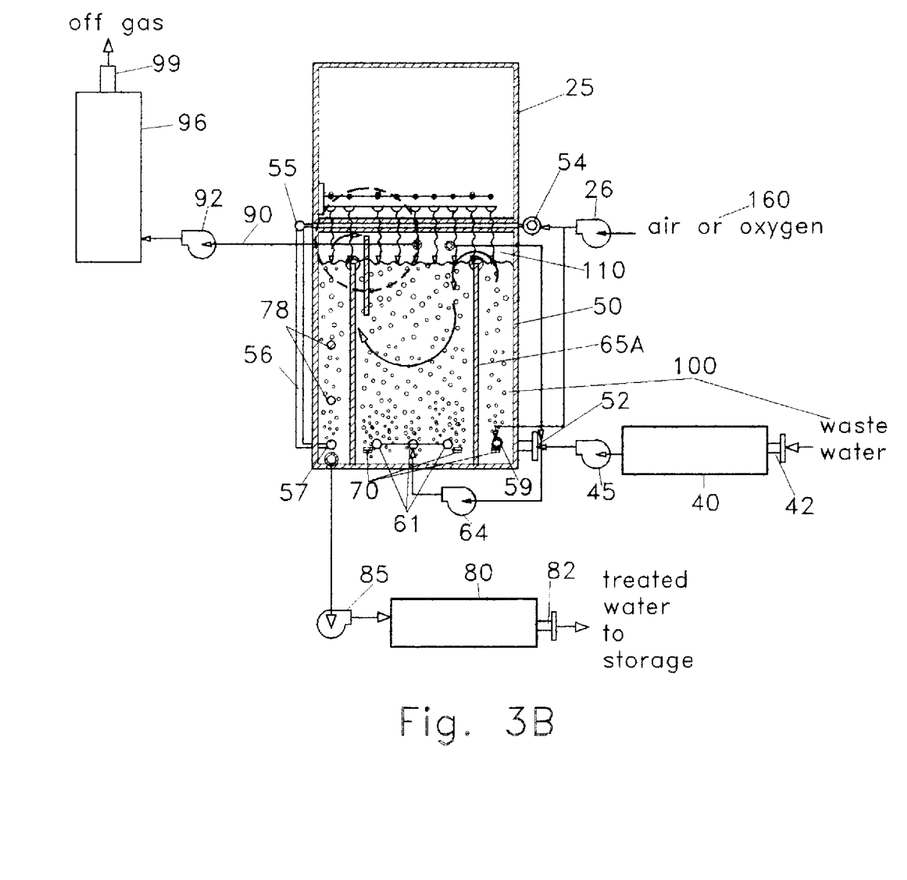

Continuing on FIG. 1, electron beam generator 20 contains the pumps, valves, and instruments necessary to create and maintain a vacuum in electron beam tube head 25. It also contains the high voltage feed connections necessary for production of an electron beam in electron beam head 25. Referring now to FIG. 3, the electron beam 150 is created in electron beam tube head 25. Electron beam tube head 25 is put under a vacuum, generally ranging from $10^{-2}$ to $10^{-5}$ torr or less. A voltage ranging from 150 to 500 Kev with an operating power of 1 to 500 Kw is then applied to electron beam filament array 21 to produce electron beam 150. Electron beam 150 is subsequently focused and directed towards electron beam generator primary window 27 by electron beam grid array 22. The energy of electron beam 150 is sufficient to pass through primary window 27, plenum 28, and secondary window 29 into reactor 50 where it interacts with the gases and water contained therein.

The electron beam tube head 25 may produce a beam of any configuration but preferably produces one that is either circular or rectangular such that it may be easily fitted to conventional tanks and piping. The electron beam produced is configured such that it contacts the entire cross-sectional surface area of the water it is treating.

As shown on FIGS. 2 and 3, the electron beam generator primary window 27 is preferably made of titanium, a material conventionally used for this purpose. However, it may also be made of various other materials resistant to corrosion. A secondary window 29 of similar construction and configuration to the primary window 27 is used to separate the primary window 27 from direct contact with the water sample and any offgases produced by the treatment process. The secondary window 29 is attached to the electron beam generator 25 such that it forms a plenum 28 between the primary and secondary windows 27, 29 that will allow for the passage of gas or air. The plenum 28 is fitted with an inlet 54, an outlet 55, and a device 26 (shown only on FIG. 3) such as a blower, compressor, or pressurized tank which will allow for the introduction and removal of gases through the plenum 28.

Another example of a suitable electron beam generator is described in U.S. Pat. No. 5,378,898 issued to Schonberg, et al. on Jan. 3, 1995, the contents of which are incorporated by reference.

Continuing on FIGS. 1, 2 and 3, the water sample to be treated enters pretreatment module 40 by pretreatment module inlet 42. It is then moved from pretreatment module 40 by pump 45 to reaction chamber inlet nozzle 52. The reaction chamber 50 has a cross-sectional area of the same general configuration and size of the electron beam windows 27 and 29, and is attached to the plenum 28 adjacent to the secondary window 29. The reaction chamber 50 includes an inlet 52, and an outlet 68 positioned to ensure that all of the water entering the reaction chamber 50 comes in contact with the electron beam. Liquid baffles 65 and 65a and gas baffle 63 are used to ensure complete interaction of the electron beam with the water sample and to prevent recirculating gases and water from mixing with the water entering the final stage of the reaction chamber 50. Flow control means such as inlet pump 45 and outlet pump 85 coupled with appropriate valves, and level instruments are provided to move the water into and through the reaction chamber. Recirculating means, such as pump 64, gas outlet nozzle 62, gas inlet nozzle 60, sparging tube 61, and interconnecting valves, and pipes or the like, are also provided to recirculate the gases through the water in reaction chamber 50.

The reaction chamber depth is designed to ensure that it will contain all of the water entering the reaction chamber 50. The reaction chamber depth also allows for a disengaging space above the surface of the water such that liquid droplets contained in the gases exiting from the surface of the water have minimal contact with the secondary window 29. The reaction chamber 50 has a sufficient depth to allow the introduction of a stripping gas into the bottom of the reaction chamber. The term "stripping gas" is meant to refer to a gas that includes highly reactive species that react with the contaminants in the organically contaminated inorganic liquid to convert these contaminants into products that can be disposed of safely or that can be recovered for subsequent use.

Continuing on FIGS. 1, 2 and 3, the stripping gas, which is preferably oxygen, is introduced into reaction chamber 50 at two points. Oxygen, or an oxygen containing gas, is introduced into the first stage of reaction chamber 50 via gas inlet 58 and sparging tube 59 and into the final stage of reaction chamber 50 using duct header 55, sparging tube header 56 and sparging tube 57. As more fully described below ozone and other activated oxygen species are formed in plenum 28 and transported into reaction chamber 50 via duct header 55, sparging tube header 56 and sparging tube 57. Means for removal of this gas, such as outlet gas flange 66, outlet gas header 90 and fan 92 are incorporated into reaction chamber 50. Means for recirculating the gas to the bottom of the reaction chamber, such as outlet nozzle 62, blower 64 and inlet nozzle 60 are provided so that this stripping gas passes back through the water. A distribution device, such as a sparging tube 61 is placed in the bottom of the reaction chamber 50 to ensure the gases entering the reaction chamber 50 form small, well distributed bubbles within the water contained in the reaction chamber 50. Means for heating and cooling the reaction chamber 50 are also incorporated. In the case of heating, suitable devices include a direct electrical heater 70 in FIG. 2, which is mounted on the outside of the reaction chamber 50, indirect hot oil heat exchangers, etc. For cooling, suitable devices include an indirect heat exchanger coupled with an air blown radiator or chiller, which are to be connected to reaction chamber 50 via water outlet flange 75 and water inlet flange 76.

Optionally, an ultraviolet light source can be included in the method and apparatus of this invention. As seen in FIGS. 2 and 3, the ultraviolet light source 78 is placed in reaction chamber 50 and is oriented so as to expose the water to the ultraviolet light. Exposing the water to an ultraviolet light source provides for additional oxidation of the organic species within the water. Suitable ultraviolet light sources are described in U.S. Pat. No. 4,189,363 issued to Beitzel on Feb. 19, 1980 and U.S. Pat. No. 4,992,169 issued to Izumiya on Feb. 12, 1991, the contents of each of which are herein incorporated by reference.

Once the water is treated, it is pumped out of reaction chamber 50 through outlet 68 into liquid post-treatment module 80 using pump 85. The treated water is removed from post-treatment module 80 via post-treatment module outlet flange 82 and sent to appropriate storage or disposal systems. Residual offgas is removed from reaction chamber 50 via offgas outlet 66. The offgas is pulled through duct 90 by blower 92 and injected into gas post-treatment module 96. The offgas is then vented to atmosphere via vent 99.

Post-treatment consists of those unit operations which are necessary to condition the effluent water and gas streams such that they will meet the regulatory requirements necessary for discharge to the environment, or in the case of recovered by-products, the specifications of the consumer. Unit processes may consist of any conventional treatment technique. In the case of water, post-treatment may consist of pH adjustment, chemical precipitators, ion exchange systems, adsorbents, etc. Gas post-treatment may consist of a catalytic oxidizer, acid gas scrubbers, adsorbents, etc. or any combination of these. The terms "post-treatment" and "post-treating" as used herein and in the claims are meant to include the above listed operations and other similar operations as would be apparent to one having ordinary skill in the art. Other examples of suitable post-treatment units can be found in U.S. Pat. No. 4,230,947; U.S. Pat. No. 3,901,807; U.S. Pat. No. 5,451,790; and U.S. Pat. No. 5,072,124, the contents of each of which are herein incorporated by reference.

Referring now to the process schematic in FIG. 3, and particularly the enlarged view shown therein, an electron beam 150 is generated by filament array 21 and focused by grid array 22, both of which are located in electron beam tube head 25. Electron beam 150 exits electron beam tube head 25 via primary window 27 where it interacts with oxygen or an oxygen containing gas 160 passing through plenum 28. The result of this interaction is the formation of a highly reactive gas 165 containing ozone and other highly reactive oxygen species. Electron beam 150 exits plenum 28 through secondary window 29 and simultaneously enters the three stages of reaction chamber 50 where it interacts with the gases and liquids contained therein.

Reaction chamber 50 is comprised of three stages through which gases and liquids contained within are allowed to react simultaneously with electron beam 150 causing the formation of ions, free radicals, excited molecules, and the subsequent oxidation of the organic contaminants contained in the gases and liquids in each stage. Stage 1 is comprised of the volume formed by the walls of reaction chamber 50 and the right side of baffle 65a. Stage 2 is comprised of the volume of the reactor between baffles 63 and 65, and baffle 65a. Stage 3 is comprised of the volume formed by the reaction chamber and the left side of baffles 63 and 65.

Continuing with FIG. 3, pretreated waste water 100 is pumped into stage 1 of reaction chamber 50 by waste water pretreatment pump 45 through water inlet flange 52 with sufficient pressure to allow waste water 100 to rise until it reaches the top of baffle 65a where it gravity flows into stage 2 of reaction chamber 50. Upon entry into stage 2, waste water 100 mixes with the water contained therein to form partially treated waste water 200. Partially treated water 200 enters stage 3, the final stage of reaction chamber 50, by hydrostatic pressure forcing the liquid beneath baffle 63 and then over baffle 65 where it is allowed to mix with the water contained therein to form treated water 300. After sufficient treatment, water 300 is removed from stage 3 by pump 85 and introduced into post-treatment module 80.

In each of the three stages of reaction chamber 50 the surfaces of the water 100, 200 and 300 interacts with electron beam 150 causing the formation of ions, free radicals, excited molecules, and the subsequent oxidation of the organic contaminants contained in each stage respectively. As the water progresses through each stage it accumulates a higher dose leading to a progressive decrease of the organic concentration as it passes from inlet to outlet of reaction chamber 50.

Simultaneous to the interaction of liquids 100, 200 and 300 with electron beam 150 each stage has a gas entering the bottom of the stage through a sparging tube. In stage 1 of reaction chamber 50 oxygen or an oxygen containing gas 160 is introduced through gas inlet flange 58 and sparging tube 59. This allows for stripping of volatile organics, either initially contained in waste water 100 or formed by its interaction with electron beam 150, providing for the removal of these organics from the liquid and further interaction with electron beam 150. In addition, agitation of liquid 100 by gas 160 causes the surface of liquid 100 to be continuously renewed promoting further interaction and subsequent oxidation of liquid phase organics by electron beam 150. Gas 110 formed by the interaction of gas 160, liquid 100, and electron beam 150 exit stage one and are allowed to flow over baffle 65a and freely mix with gases contained in the second stage of reaction chamber 50.

In stage 3 of reaction chamber 50, highly reactive gas 165, the formation of which was described above, is introduced into the bottom of the stage via headers 55 and 56, and sparging tube 57. This allows for stripping of the partially oxidized organics contained in waste water 300 formed by its interaction with electron beam 150, providing for removal of these organics from the liquid and further interaction with electron beam 150. In addition, agitation of liquid 300 by gas 165 causes the surface of liquid 300 to be continuously renewed promoting further interaction and subsequent oxidation of liquid phase organics by electron beam 150. Gas 310, formed by the interaction of gas 165, liquid 300, and electron beam 150 exit stage 3 by flowing over baffle 63 where they are allowed to freely mix with gases contained in the second stage of reaction chamber 50.

In stage 2 of reaction chamber 50, gas 210 comprised of a mixture of gases 110, 310, and the gases formed by the interaction of electron beam 150 with liquid 200 and gas 210. Unlike the gases 110 and 310 in stages 1 and 3 respectively, gas 210 is continuously recirculated through liquid 200 by means of gas outlet 62, blower 64, gas inlet 60, and sparging tube 61. This continuous recirculation allows for interaction of the highly activated gas species formed by interaction of gas 210 with electron beam 150 with the organics and free radicals in liquid 200 yielding further oxidation. As in stages 1 and 2 agitation of liquid 200 by gas 210 causes the surface of liquid 200 to be continuously renewed promoting further interaction and subsequent oxidation of liquid phase organics by electron beam 150. In addition, the recirculation of gas 210 through liquid 200 provides for the scrubbing and concentration of soluble organics and inorganic compounds in liquid 200. This results in higher utilization of the oxygen introduced into reaction chamber 50, which in turn minimize the amount of offgas requiring post-treatment.

The process, which can be either a batch or continuous process, is allowed to continue until waste water 100 is effectively treated. The calculation of appropriate reaction times is within the skill of the art and largely dependent on the level and type of contaminants in the water sample. Particular reaction times can be calculated based on test data. For example, appropriate reaction times can be back calculated from the data presented in FIGS. 4, 5 and 6 above and from the dosage ranges set forth above.

Once the waste water 100 is treated, it is pumped out of reaction chamber 50 through outlet 68 into liquid post-treatment module 80 using pump 85. The decontaminated water is removed from post-treatment module 80 via liquid outlet 82 and then transported or disposed of according to the user's need. Residual offgas is removed from reaction chamber 50 via offgas outlet 66. The offgas is pulled through duct 90 by blower 92 and injected into gas post-treatment module 96. The offgas is then vented to atmosphere via vent 99 or can be otherwise disposed of according the user's needs.

Figure 4:
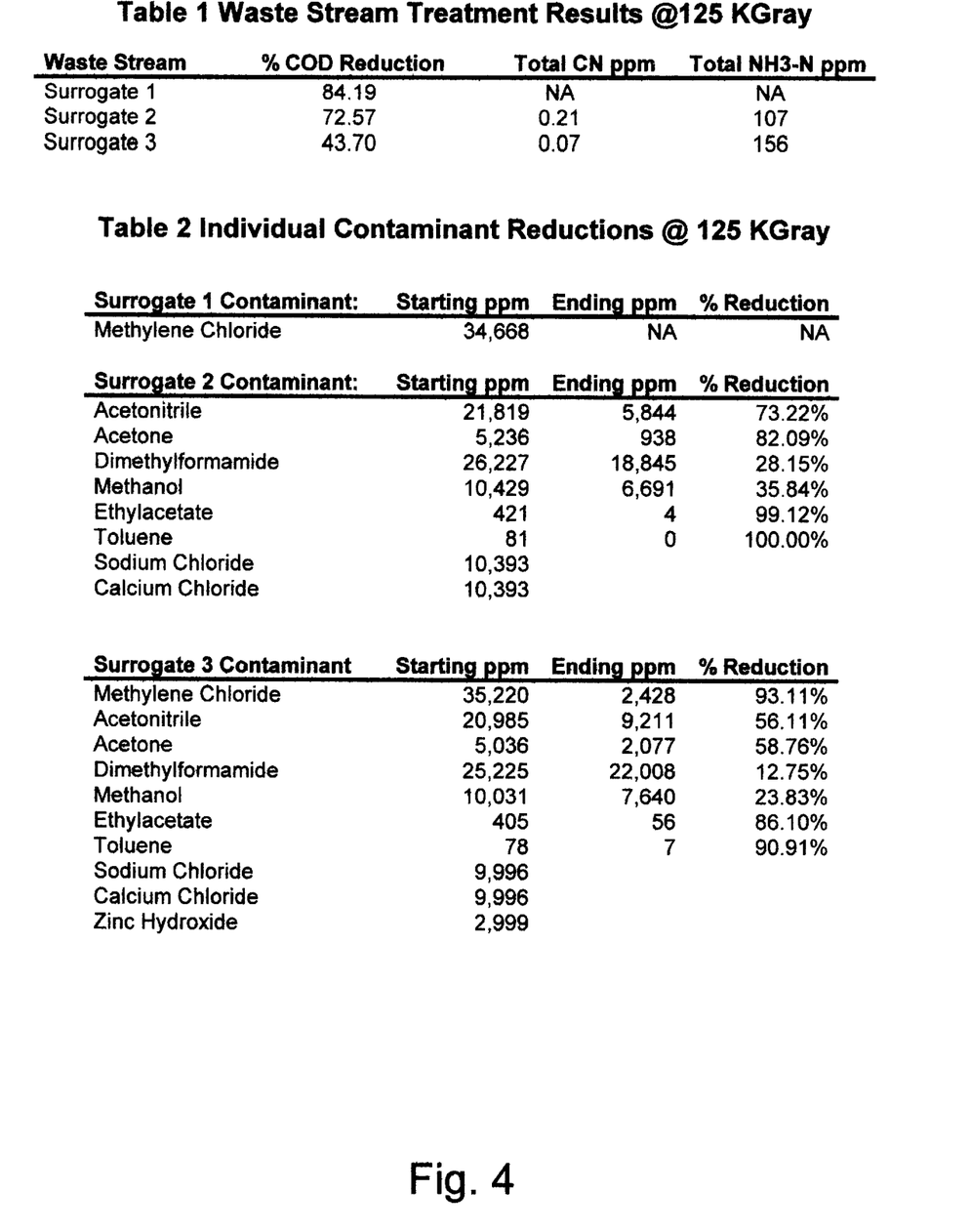
FIG. 4 depicts Tables 1 and 2.
Figure 5:
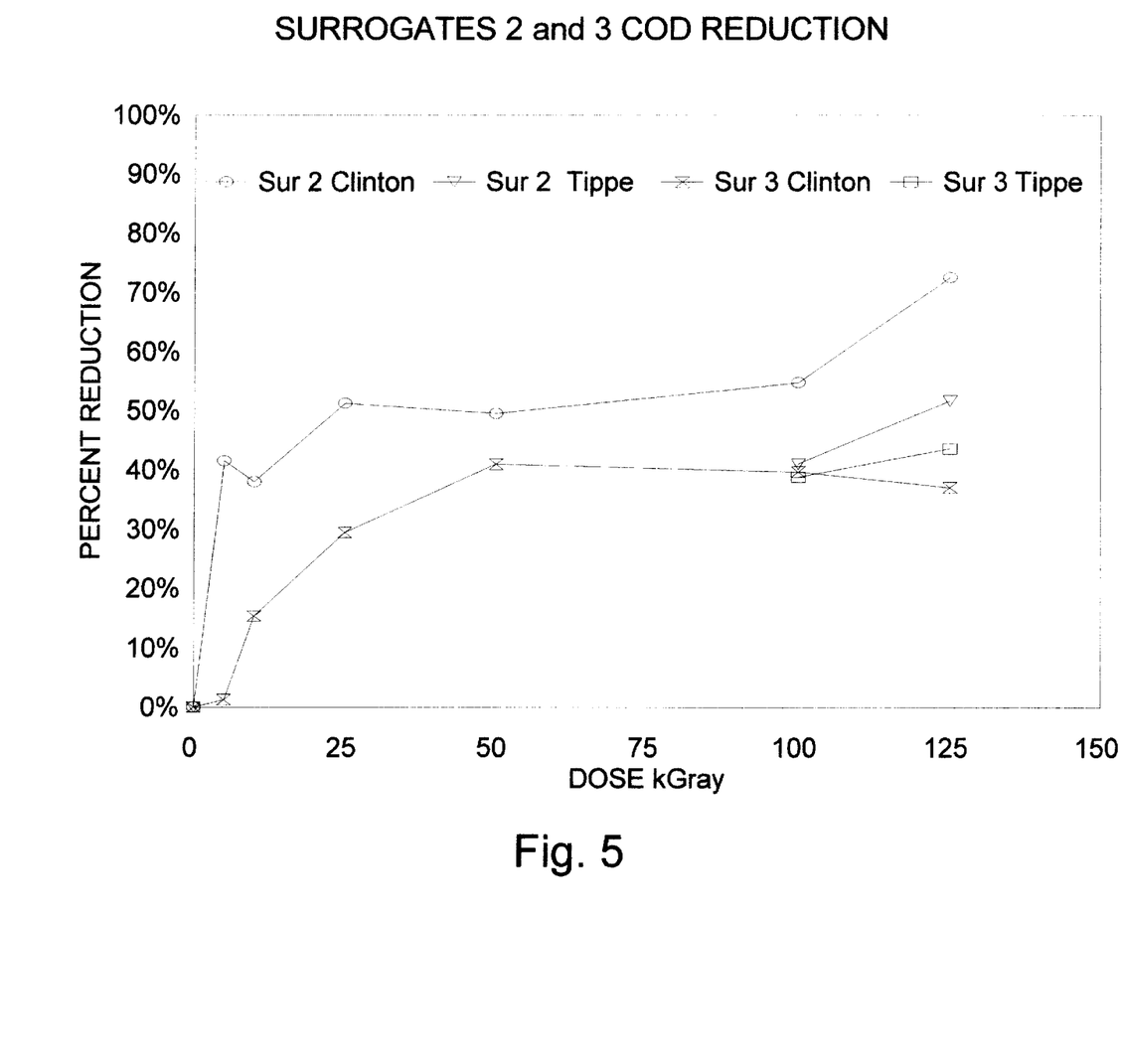
FIG. 5 displays a graphical presentation of COD reduction versus dose for two tested waste streams.
Figure 6:
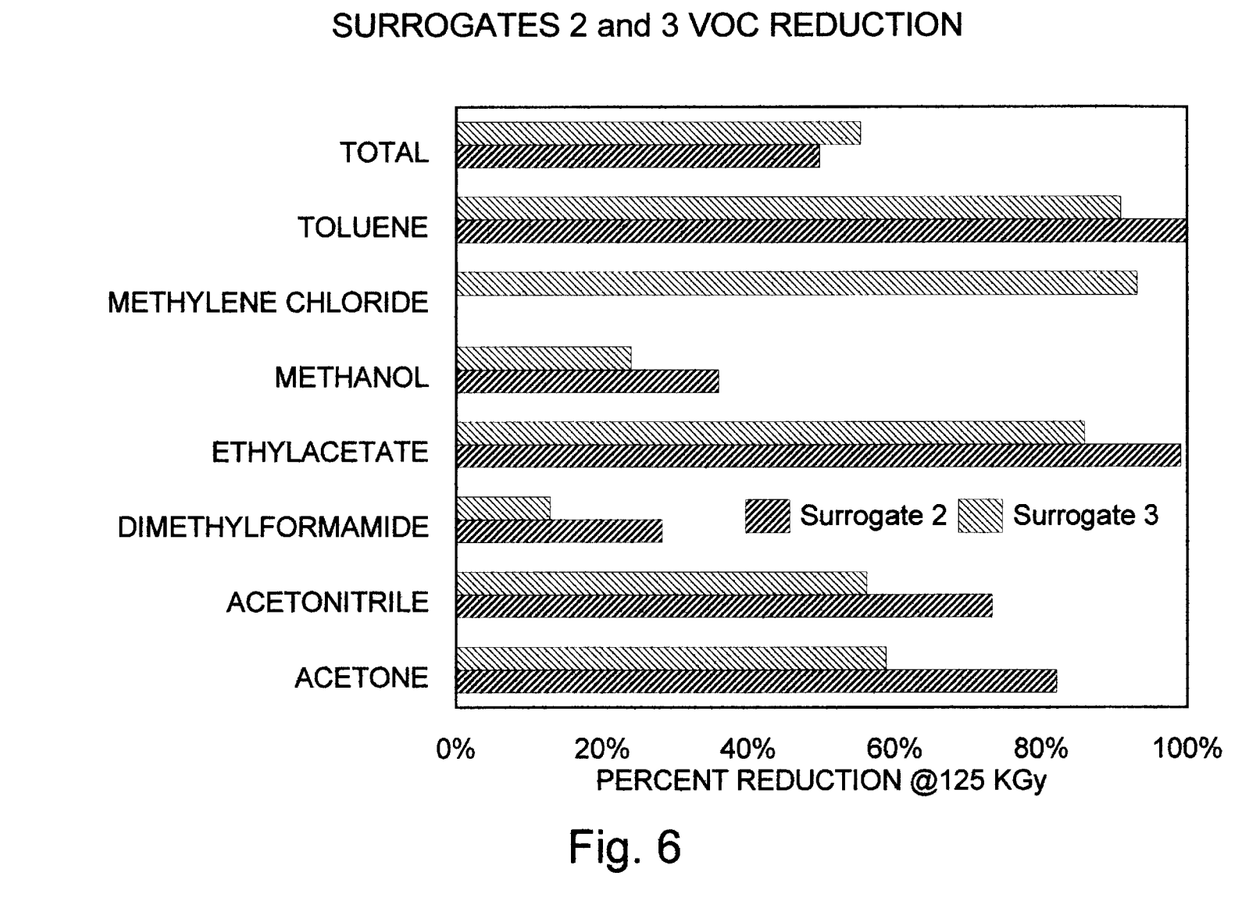
FIG. 6 displays a graphical presentation of overall removal efficiency for two tested waste streams.

Effectiveness data for the method and the apparatus of this invention are set forth in FIGS. 4, 5 and 6. FIG. 4, Table 1, shows the overall COD reduction, and the total cyanide (CN) and ammonia nitrogen (NH3-N) remaining in the treated water for a dose of 125 Kgrays. FIG. 4, Table 2, shows the overall reduction of individual compounds contained in the three water surrogates tested. FIG. 5 graphically depicts the overall COD reduction achieved versus accumulated dose for surrogates 2 and 3. FIG. 6 graphically depicts the data displayed in FIG. 4, Table 2, for surrogates 2 and 3.

EXAMPLE 2

In addition to producing a clean water sample, the process and apparatus of this invention can be set up to produce a usable by-product. An example of a usable by-product that can be produced by the system through the scrubbing and concentration of water soluble organic and inorganic compounds from the gas phase is hydrochloric acid. Hydrochloric acid is difficult to concentrate. See Perry, *Chemical Engineering Handbook,* Sixth Edition, McGraw-Hill, 1984). When methylene chloride is the organic contaminant, free chloride ions and hydrochloric acid gas are generated in gases 110, 210 and 310. Recirculation of the chloride ions and the acid into the water results in the production of a concentrated hydrochloric acid solution in liquid 300. The hydrochloric acid is thus a by-product salvaged from the waste water. Further, concentration of the hydrochloric acid is an example of and is included in the term "post-treatment".

Another example of a usable by-product that can be produced by the system is carbon dioxide. Carbon dioxide is a relatively insoluble gas difficult to concentrate by scrubbing from the gas phase. See Perry, *Chemical Engineering Handbook,* Sixth edition, (McGraw Hill, 1984). When methylene chloride or any other organic chemical is fully oxidized it forms carbon dioxide. The utilization of oxygen in the present invention coupled with the removal and concentration of soluble organic and inorganic by-products by the liquid phase produces an offgas with an unusually high concentration of carbon dioxide which can be easily concentrated. The carbon dioxide is thus a by-product salvaged from the waste water. Further, concentration of the carbon dioxide is an example of and is included in the term gas post-treatment.

EXAMPLE 3

Gases, such as water vapor, are often generated during industrial processes wherein the gas phase includes an organic contaminant. An example of an organic contaminant is methylene chloride. Thus, an inorganic gas that is contaminated by methylene chloride can be treated by the apparatus of this invention by introducing the gas into reaction chamber 50 via gas inlet flange 58 and sparging tube 59. The contaminated gas is introduced into a liquid medium, such as water, that is present in reaction chamber 50. The water can be clean or contaminated water.

Once the organically contaminated inorganic gas is introduced, a stripping gas can be introduced through sparging tube headers 56 and gas sparging tube 57 as described above. The process of this invention is then performed as described above for an organically contaminated water sample. Thus, organically contaminated inorganic gases can be treated using the apparatus of this invention.

Other examples of organically contaminated liquids that can be treated using the method and apparatus of this invention include liquid ammonia as well as a variety of aqueous acid, base and salt solutions. Indeed, even molten glass can be treated by the apparatus of this invention.

Further, the method and apparatus of this invention can be used as a pretreatment or post-treatment step as a part of another system, such as a system that uses biological treatment, as with microorganisms. Additionally, such biological treatments can be used as a post-treatment step with the method and apparatus of this invention and thus, the terms "post-treatment" and "post-treating" are meant to also include biological treatments.

The invention described herein is a significant advance in the current state of the art. It provides a more effective, safer, and less time consuming method for the treatment of a variety of contaminants found in a variety of organically contaminated inorganic liquids and in particular, waste water. In addition, the process also lends itself to the recovery of valuable by-products.

Thus, although there have been described particular embodiments and examples of the present invention of a new and useful Electron Beam Process and Apparatus for the Treatment of an Organically Contaminated Inorganic Liquid or Gas, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A method of treating an organically contaminated inorganic liquid, the method comprising the steps of generating a gaseous phase by exposing the organically contaminated inorganic liquid to an electron beam; and recirculating the gaseous phase into the organically contaminated inorganic liquid.

2. A method of treating an organically contaminated inorganic liquid, the method comprising the steps of:
   a. generating a gaseous phase by exposing the organically contaminated inorganic liquid to an electron beam;
   b. recirculating the gaseous phase into the organically contaminated inorganic liquid; and
   c. introducing a stripping gas into the organically contaminated inorganic liquid.

3. The method according to claim 1 further comprising the step of introducing the organically contaminated inorganic liquid into a reaction chamber, the reaction chamber positioned so that the liquid will be exposed to the electron beam.

4. The method according to claim 1 further comprising the step of pretreating the organically contaminated inorganic liquid before exposing the liquid to the electron beam.

5. The method according to claim 3 wherein the electron beam has the same cross-sectional shape as the reaction chamber.

6. The method according to claim 1 further comprising the step of post-treating the organically contaminated inorganic liquid after exposing the liquid to the electron beam.

7. The method according to claim 1 wherein the organically contaminated inorganic liquid is water.

8. The method according to claim 1 further comprising the step of exposing the organically contaminated inorganic liquid to ultraviolet radiation.

9. The method according to claim 2 further comprising the steps of collecting the stripping gas after it passes through the organically contaminated inorganic liquid and recirculating the collected stripping gas into the organically contaminated inorganic liquid.

10. The method according to claim 2 wherein the stripping gas is generated by passing a gas through the electron beam, the passing of the gas through the electron beam occurring at a point along the electron beam before the electron beam contacts the organically contaminated inorganic liquid.

11. The method according to claim 2 wherein the electron beam passes through a first window and a second window before contacting the organically contaminated inorganic liquid, the first window and the second window defining a plenum.

12. The method according to claim 3 further comprising the step of circulating the organically contaminated inorganic liquid within the reaction chamber.

13. The method according to claim 6 wherein the post-treating step comprises salvaging a by-product after the organically contaminated inorganic liquid has been treated.

14. The method according to claim 11 wherein the stripping gas is generated by passing a gas through the plenum.

15. The method according to claim 1 further comprising the step of post-treating the gaseous phase.

16. The method according to claim 2 further comprising the step of post-treating the gaseous phase and the stripping gas.

17. The method according to claim 6 wherein the post-treating step comprises biological treatment.

18. A method of treating an organically contaminated inorganic gas, the method comprising the steps of introducing the organically contaminated inorganic gas into a liquid medium; generating a gaseous phase by exposing the liquid medium to an electron beam; and recirculating the gaseous phase into the liquid medium.

19. A method of treating an organically contaminated inorganic gas, the method comprising the steps:

a. introducing the organically contaminated inorganic gas into a liquid medium;

b. generating a gaseous phase by exposing the liquid medium to an electron beam;

c. recirculating the gaseous phase into the liquid medium; and d. introducing a stripping gas into the liquid medium.

20. The method according to claim 18 further comprising the step of introducing the organically contaminated inorganic gas into a reaction chamber, the reaction chamber including the liquid medium, the reaction chamber positioned so that the liquid medium will be exposed to the electron beam.

21. The method according to claim 18 further comprising the step of pretreating the organically contaminated inorganic gas before introducing the organically contaminated inorganic gas into the liquid medium.

22. The method according to claim 20 wherein the electron beam has the same cross-sectional shape as the reaction chamber.

23. The method according to claim 18 further comprising the step of post-treating the organically contaminated inorganic gas.

24. The method according to claim 18 wherein the liquid medium is water.

25. The method according to claim 18 further comprising the step of exposing the organically contaminated gas to ultraviolet radiation after it is introduced into the liquid medium.

26. The method according to claim 19 further comprising the steps of collecting the stripping gas after it passes through the liquid medium and recirculating the collected stripping gas into the liquid medium.

27. The method according to claim 19 wherein the stripping gas is generated by passing a gas through the electron beam, the passing of the gas through the electron beam occurring at a point along the electron beam before the electron beam contacts the liquid medium.

28. The method according to claim 19 wherein the electron beam passes through a first window and a second window before contacting the liquid medium, the first window and the second window defining a plenum.

29. The method according to claim 20 further comprising the step of circulating the liquid medium within the reaction chamber.

30. The method according to claim 23 wherein the post-treating step comprises salvaging a by-product after the organically contaminated inorganic gas has been treated.

31. The method according to claim 28 wherein the stripping gas is generated by passing a gas through the plenum.

32. The method according to claim 18 further comprising the step of post-treating the liquid medium after exposing the liquid medium to the electron beam.

33. The method according to claim 19 further comprising the step of post-treating the organically contaminated inorganic gas and the stripping gas.

34. The method according to claim 23 wherein the post-treating step comprises biological treatment.

35. A method of treating an organically contaminated inorganic liquid, the method comprising the steps of:

a. exposing the organically contaminated inorganic liquid to an electron beam;

b. introducing a stripping gas into the organically contaminated inorganic liquid; and c. recirculating the exposed organically contaminated inorganic liquid into the organically contaminated inorganic liquid.

* * * * *